(12) United States Patent
Gurovich et al.

(10) Patent No.: US 8,891,977 B2
(45) Date of Patent: Nov. 18, 2014

(54) RECEIVER CHIP AND METHOD FOR ON-CHIP MULTI-NODE VISIBLE LIGHT COMMUNICATION

(75) Inventors: Martin Gurovich, Ramat Gan (IL); Josef Shwartz, Marina del Rey, CA (US)

(73) Assignee: Supreme Architecture Ltd., Rosh Ha'Ayn (IL)

( * ) Notice: Subject to any disclaimer, the term of this patent is extended or adjusted under 35 U.S.C. 154(b) by 500 days.

(21) Appl. No.: 13/246,928

(22) Filed: Sep. 28, 2011

(65) Prior Publication Data

US 2012/0076509 A1 Mar. 29, 2012

Related U.S. Application Data

(60) Provisional application No. 61/387,506, filed on Sep. 29, 2010.

(51) Int. Cl.
*H04B 10/00* (2013.01)
*H04B 10/116* (2013.01)

(52) U.S. Cl.
CPC .................................. *H04B 10/116* (2013.01)
USPC ........................................... 398/202; 398/212

(58) Field of Classification Search
USPC .................................................. 398/212, 202
See application file for complete search history.

(56) References Cited

U.S. PATENT DOCUMENTS 5,909,280 A * 6/1999 Zavracky ...................... 356/454
2005/0191062 A1* 9/2005 Rafferty et al. ............... 398/202

* cited by examiner

*Primary Examiner* — Danny Leung
(74) *Attorney, Agent, or Firm* — Pearl Cohen Zedek Latzer Baratz LLP

(57) ABSTRACT

A receiver chip, system and method for on-chip multi-node visible light communication, the receiver chip comprising: an array of receiver cells comprising an array of photodetectors, each receiver cell comprises at least one photodetector and is to receive light through the at least one photodetector, and a logical layer for independently configuring at least one selected receiver cell as a communication receiving channel. The system comprises an array of receiver cells comprising an array of photodetectors, each receiver cell includes at least one photodetector and is to receive light through the at least one photodetector, a logical layer to independently configure at least one selected receiver cell as a communication receiving channel, and a processor to receive data from the logical layer and control the logical layer for configuration of the receiver cells.

9 Claims, 7 Drawing Sheets

RECEIVER CHIP AND METHOD FOR ON-CHIP MULTI-NODE VISIBLE LIGHT COMMUNICATION

CROSS REFERENCE TO RELATED APPLICATIONS

This Application claims the benefit of U.S. Provisional Application Ser. No. 61/387,506, filed Sep. 29, 2010, which is hereby incorporated by reference in its entirety.

BACKGROUND OF THE INVENTION

In the field of optical communication which does not use optical guides/fibers in order to transmit the communication, several methods are known. These methods belong to several different sub-classes, usually referred to by different terms, such as Wireless/Fiberless Optical Communication (WOC/FOC, mainly used to describe indoors, short range systems), Free Space Optical Communication (FSO, mainly used to describe outdoors, mid/long range systems), Visible Light Communication (VLC, mainly used to describe indoors and outdoors, on the visible light spectrum).

It is estimated that for the same conditions of data rate, power, distances, angles, etc. optical communication is about ten times more efficient than RF communication. Usually, the quality, and therefore the efficiency of communication method is determined by measuring the Signal to Noise Ratio (SNR) provided by the method.

Although the optical communication is much more efficient than RF communication, both methods have a similar disadvantage in wide angle transmissions. Wide angle transmissions and receptions enable receiving the transmission over a large angular area and thus, for example, reduce the need for aiming the transmission, and enable roaming within the receiving area. However, for all methods which do not use guides, fibers or cables (both optical and RF) the energy and therefore the SNR are a result of the solid angle of transmission and the distance. In the transmitter side, the wider is the solid angle of transmission, the lower will be the energy flux; additionally, the flux drops proportionally to $1/r^2$, where r is the radius of the transmitted area. In the receiver side, the wider is the solid angle of reception, the larger is the background noise collected. As the SNR decreases (due to low energy or high noise), the ability to achieve high data rates for long distances may decrease also.

Usage of narrow angle transmissions and reception may reduce the above mentioned deficiencies. However, the possibilities in using narrow angle transmission or reception are very limited due to the directionality of the transmission. The narrow angle requires accurate detection and aiming of the transmission to the receiver, and therefore, for example, transmissions to mobile receivers (or from mobile transmitters) may be hard to apply.

Another known sub-class of methods includes usage of angular diversity and/or spatial multiplexing, which usually employ multiple transmitters and/or multiple receivers. These methods may provide some more operational freedom relative to regular narrow angle transmissions. However, these methods may still require scanning of the space for detection of the required receiver/transmitter, may support only point to point (one-on-one) communication and may suffer from several disconnections in case the receiver and or transmitter are in relative movement

SUMMARY OF THE INVENTION

Embodiments of the present invention may provide a receiver chip for on-chip multi-node visible light communication, the receiver chip including: an array of receiver cells including an array of photodetectors, each receiver cell includes at least one photodetector and is to receive light through said at least one photodetector; and a logical layer for independently configuring at least one selected receiver cell as a communication receiving channel.

In some embodiments, the receiver chip may include an optical element to concentrate light onto said array of receiver cells.

According to some embodiments of the present invention, each of said photodetectors may include first and second electrode plates, wherein at least the first electrode plate is an independent plate so that the electric field in each photodetector is independently configurable. The independent plates may include several distributed contact plates connected in parallel to a connector plate.

In some embodiments, the receiver cells may have hexagonal cross-sections.

Embodiments of the present invention may provide a method for on-chip multi-node visible light communication. In some embodiments, the method may include: selecting a specific receiver cell of an array of receiver cells to be activated as a communication channel, the array of receiver cells including an array of photodetectors, each receiver cell includes at least one photodetector and is to receive light through said at least one photodetector; receiving light through said at least one photodetector of the specific receiver cell; and processing the received light according to independent configurations of the selected cell.

In some other embodiments, the method for on-chip multi-node visible light communication may include: receiving light through at least one photodetector included in a receiver cell of an array of receiver cells, the array of receiver cells including an array of photodetectors, each receiver cell includes at least one photodetector and is to receive light through said at least one photodetector; identifying the receiver cell location; and processing the received light according to independent configurations of the selected cell.

A system for on-chip multi-node visible light communication according to some embodiments of the present invention may include: an array of receiver cells including an array of photodetectors, each receiver cell includes at least one photodetector and is to receive light through said at least one photodetector; a logical layer to independently configure at least one selected receiver cell as a communication receiving channel; and a processor to receive data from said logical layer and control said logical layer for configuration of said receiver cells.

According to some embodiments, the processor is to process light carrying a communication signal received through said at least one photodetector of a specific receiver cell according to independent configurations of the specific receiver cell.

Further according to some embodiments, the processor is to select a specific receiver cell of said array of receiver cells to be activated as a communication channel.

In some other embodiments, the processor is to identify location in said array of receiver cells of a receiver cell through which light is received.

According to some embodiments of the present invention, the processor may dedicate a searching channel adjacent to said receiver cell activated as a communication channel and to detect spatial shift of incident light carrying the communication. The processor may constantly change the location of said dedicated searching channel.

In some embodiments, the processor may identify as a back-up channel a receiver cell that receives light carrying said communication signal in a secondary path and switch to receive the communication signal from back-up channel if said specific receiver cell fails to receive the signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
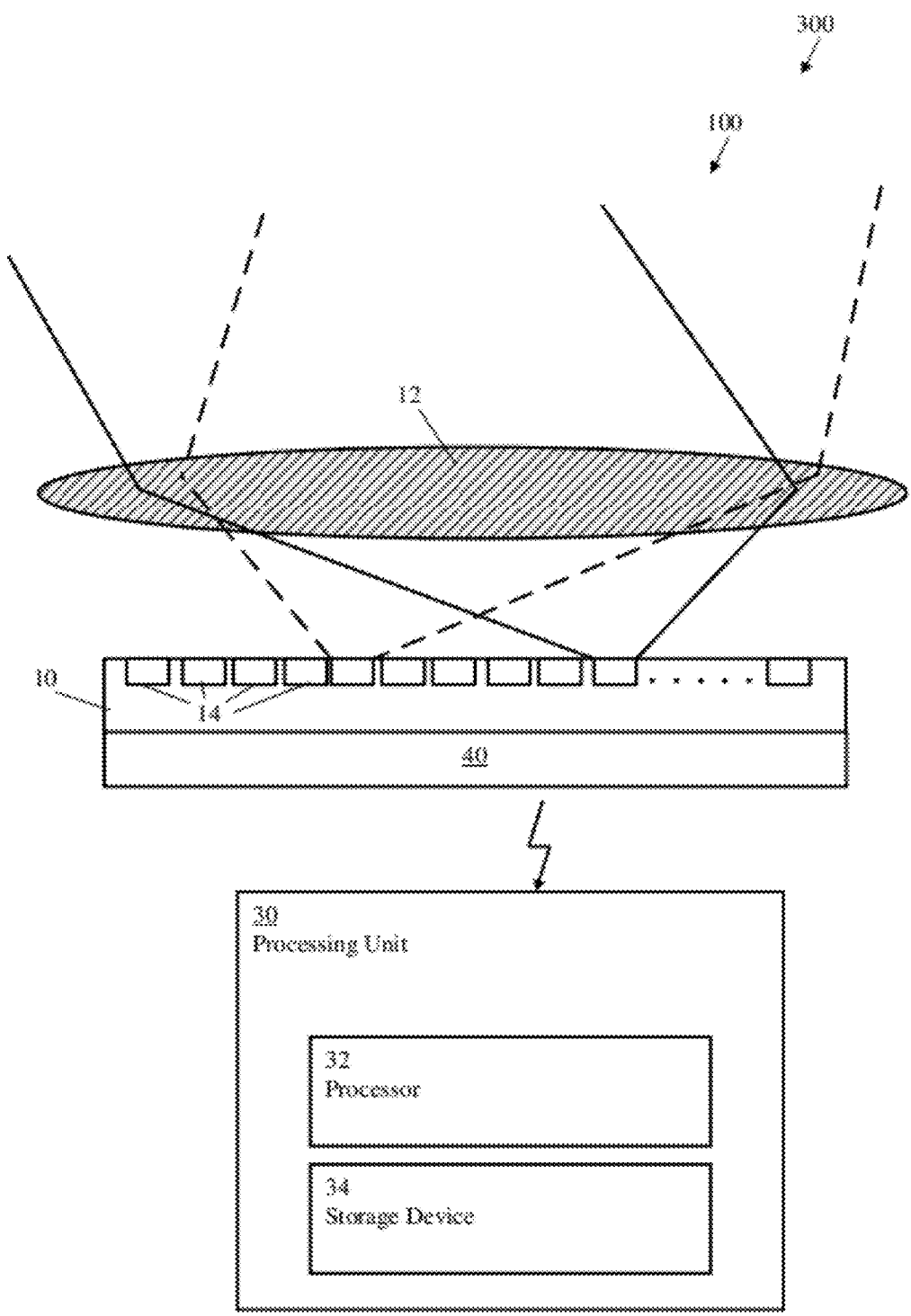
FIG. 1 is a schematic illustration of a system for on-chip multi-node visible light communication according to embodiments of the present invention, that show a schematic cross-sectional illustration of a receiver chip according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the present invention may provide a receiver chip and method for improved optical wireless communication. An optical receiver chip provided by embodiments of the present invention may support mobile communication for multiple independent and fast channels simultaneously, and thus may enable new applications. Additionally, an optical receiver chip provided by embodiments of the present invention may be compact in size.

Figure 2:
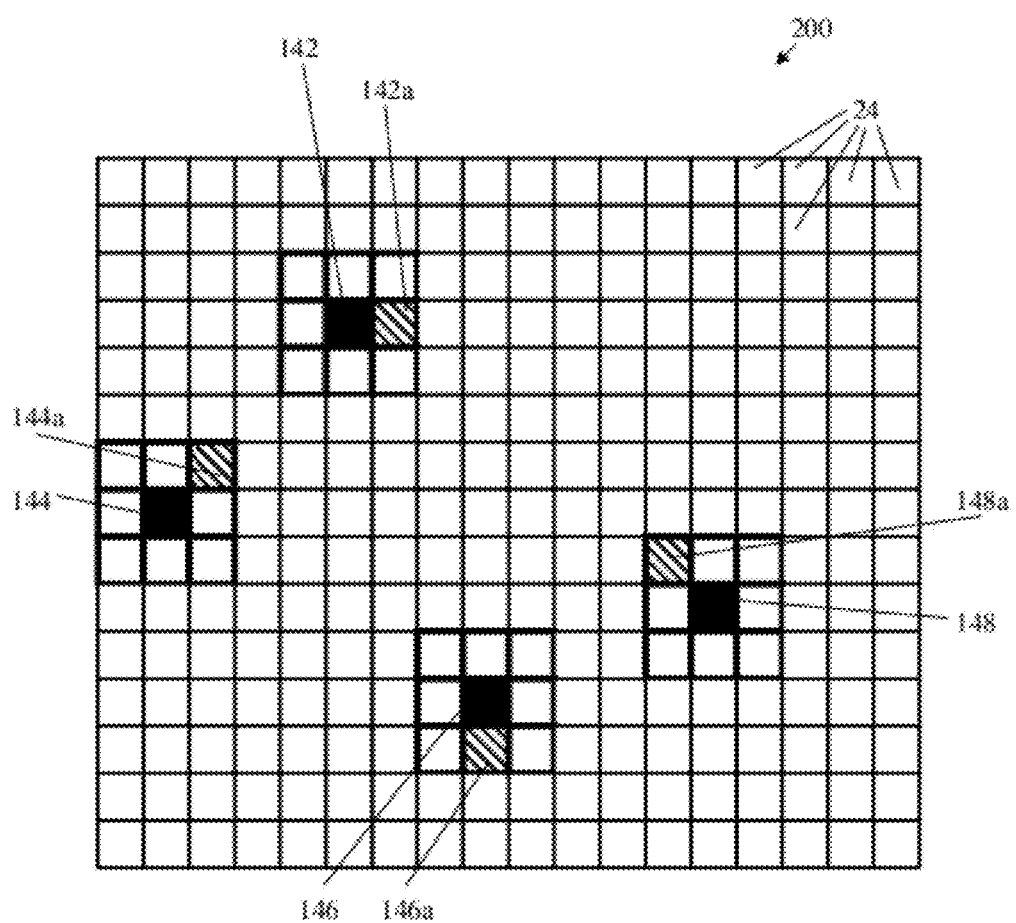
FIG. 2 is a schematic illustration of a two dimensional receiver array of receiver cells, which may be included in receiver chip according to embodiments of the present invention.

Reference is now made to FIG. 1, which is a schematic illustration of a system 300 for on-chip multi-node visible light communication according to embodiments of the present invention. System 300 may include a receiver chip 100 and a processing unit 30, which may include a processor 32 and a storage device 34. Receiver chip 100 according to embodiments of the present invention, as shown in FIG. 1 by a schematic cross-sectional illustration, may include an array of photodetectors 14 arranged on a substrate 10. Additionally, a logical layer 40 including an electronic circuit and/or interconnections (not specified in the drawings) may be arranged on substrate 10, and may be, for example, physically embedded in and/or integral with substrate 10. Photodetectors 14 may be arranged in a one-dimensional array or two-dimensional array, as shown in FIG. 2 and described in detail below. In the cross-sectional illustration of FIG. 1 a row of photodetectors 14 is shown, which may be included in a one-dimensional or two-dimensional array of photodetectors 14, when viewed along a viewing line substantially perpendicular to the light-sensitive area of receiver chip 100. Additionally, receiver chip 100 may include an optical element (or elements) 12 to concentrate light from a wide angle field of view onto the array of photodetectors 14. Alternatively, optical element(s) 12 may be separate from chip 100 and/or may be independently installed in an arrangement with chip 100. Optical element 12 may include, for example, a converging lens on top of the chip, or an array of micro-lenses optically associated with each one of photodetectors 14. It will be appreciated that photodetectors 14 may include any suitable photo-sensitive elements, such as, for example, photodiodes, phototransistors, photoresistors, optical detectors, photovoltaic cells, chemical detectors and/or any other suitable photo-sensitive elements.

By concentrating the light onto the array of photodetectors 14, each photodetector 14 may receive light from a respective narrow spatial angle. Therefore, the wide angle field of view of receiver chip 100 is divided into multiple narrow angle fields of view, each detected by a respective photodetector 14. Accordingly, substantially all the wide angle field of view is covered by the aggregated narrow angle fields of view of photodetectors 14. Therefore, when an optical communication transmission is received on a photodetector 14, it is possible to identify the direction from which the communication is coming and thus the transmitter position. Since each photodetector 14 may receive light from a narrow angle, the background noise received by each photodetector 14 is reduced relative to that of a wide angle detection. Additionally, detection by photodetectors 14 of multi-path propagating transmissions caused by reflections and/or other distortions may be reduced.

Logical layer 40 implemented by the underlying electronics of chip 100 and/or processing unit 30 may determine and/or set, change and/or update a location and/or configuration of communication channels in array of photodetectors 14, as further described with reference to FIGS. 4A and 4B. For example, processing unit 30 and/or processor 32 may control and receive data from logical layer 40, for example for configuration of photodetectors 14.

The operations of, and the data received and/or collected by, receiver chip 100 according to embodiments of the present invention, as described herein, may be controlled and/or processed by processing unit 30. Processor 32 and/or processing unit 30 may be specially constructed for the desired purposes, or may include general purpose computers selectively activated or reconfigured by a computer program stored in the computers, for example in storage device 34. Storage device 34 may be or include a non-transitory computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

Unless specifically stated otherwise, as apparent from the following discussions, it is appreciated that throughout the specification discussions utilizing terms such as "processing", "computing", "storing", "determining" "comparing", "detecting", "selecting", "activating", "configuring", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

According to embodiments of the present invention, storage device 34 may include an article such as a non-transitory computer or processor readable storage medium, such as for example a memory, a disk drive, or a USB flash memory encoding, including or storing instructions, e.g., computer-executable instructions, which when executed by processor 32, cause processor 32 to carry out methods disclosed herein. Additionally, the instructions may cause processor 32 to execute processes that carry out methods disclosed herein.

Reference is now made to FIG. 2, which is a schematic illustration of a two dimensional receiver array 200 of receiver cells 24, which may be included in receiver chip 100 according to embodiments of the present invention. For example, array 200 may include an array of photodetectors 14. Each receiver cell 24 may include a corresponding photodetector 14 or cluster of photodetectors 14, such that each receiver cell 24 may receive light via the corresponding photodetector 14 or cluster of photodetectors 14. It will be appreciated that the two dimensional array 200 may include any number of cells 24 and is not limited to the number of receiver cells 24 shown in FIG. 2. Receiver array 200 may support a plurality of channels for receiving communication transmissions simultaneously. The number of channels which may be supported by receiver array 200 may depend on various physical and logical limitations, such as, for example, the size of chip 100/array 200, the number/shape/arrangement of photodetectors 14/cells 24 and/or by underlying logical structure limitations.

Each of the plurality of channels may be independently addressable and mobile over the chip, so that communication transmissions may arrive from substantially any direction within the wide field of view covered by receiver cells array 200. Each channel may have a respective location, gain, noise, background removal level and bandwidth substantially independently from the other channels. Each channel may occupy one cell 24 or a cluster of several adjacent cells 24.

In order to enable roaming of receiver chip 100 and/or mobility of the transmitter(s) conveying the communication transmissions, some of the channels may be utilized, additionally to or instead of receiving communication transmissions, for detection of spatial shift of the incident light power carrying the communication, adjacent to a communication channel or at any other distance/position. When spatial shift is detected, for example, from a first cell 24 toward a second cell 24, the second cell 24 may be activated for receiving communications and/or identified as the communicating channel, and thus the communicating channel may change position on chip 100. The location and/or configuration of the communication channels and searching channels may be constantly set, changed and/or updated by the logical layer implemented by the underlying electronics of chip 100, as further described with reference to FIG. 4.

For example, FIG. 2 depicts four communication channels located at receiver cells 142, 144, 146 and 148 of array 200. In some embodiments of the present invention, each communication channel may be accompanied by an adjacent dedicated searching channel for detection of spatial shift of the communication transmissions. In the example of FIG. 2, at each moment, the searching channels may be located at one of the receiver cells around the respective communication channel. For example, at a certain time, the searching channels may be located at cells 142a, 144a, 146a and 148a, each dedicated to a communication channel located at one of cells 142, 144, 146 and 148 respectively. The location of each searching channel at one of the receiver cells around the respective communication channel may constantly change, for example, in order to detect and/or monitor spatial shift of the incident light power carrying the communication. The locations of cells 142, 144, 146, 148, 142a, 144a, 146a and 148a in FIG. 2 are for demonstration only and embodiments of the present invention are not limited to these or to any other specific locations. Receiver cells 142, 144, 146, 148, 142a, 144a, 146a and 148a are included in the plurality of receiver cells 24 and may be physically identical to any other receiver cell 24 in array 200.

When the transmission is shifted from a communicating channel towards the momentary location of a searching channel, spatial shift is detected by the searching channel. Upon detection of the spatial shift, the searching channel may logically become the communicating channel, while the former communicating channel may logically become the searching channel. As mentioned above, the location and/or configuration of the communication channels and searching channels may be constantly set, changed and/or updated by the logical layer implemented by the underlying electronics of chip 100, independently from other channels on array 200. This property enables avoiding loss of data by tracing of relative movement of the transmitter(s) conveying the communications, without analog switching of the channels.

Figure 3:
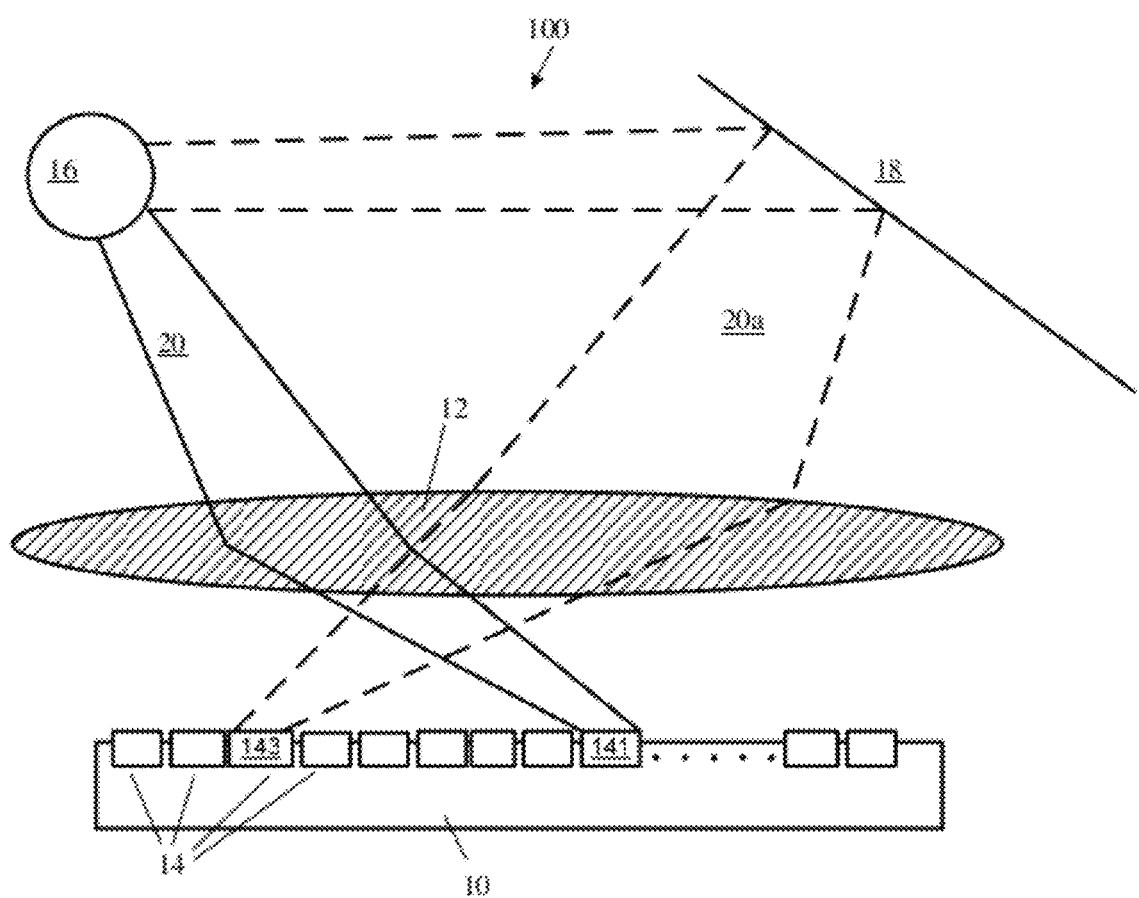
FIG. 3 is a schematic illustration of a receiver chip receiving transmission via a main path and a secondary path, according to embodiments of the present invention.

The independent addressability and configuration of the channels supported by chip 100 may enable utilization of some channels as back-up channels, for receiving a transmitted communication via a secondary path. Reference is now made to FIG. 3, which is a schematic illustration of a receiver chip 100 receiving transmission via a main path 20 and a secondary path 20a, according to embodiments of the present invention. For example, especially in indoors applications (but also in outdoors applications), the communication transmitted from a transmitter 16 may be reflected from or pass through objects such as object 18 and therefore the same transmission may be received via a secondary path 20a in addition to the main path 20, usually with a certain phase shift/delay and/or with reduced intensity relative to the main path transmission. The secondary path transmission may be received in a different spatial angle and thus, for example, received by a different photodetector 14 than the main path transmission. Some of the communication channels may be used for receiving the secondary path transmissions, for example, as back-up for the main path transmission. For example, in FIG. 3, the main path transmission is received via a communication channel at a photodetector 141, which is one of the plurality of photodetectors 14, and the secondary path transmission is received via a back-up communication channel at a photodetector 143, which is also one of the plurality of photodetectors 14. Since the signal received in a back-up communication channel is usually weaker than the signal received via the main path, the back-up channel may require a greater amplification/gain. As mentioned above, according to embodiments of the present invention, each channel may have a respective location, gain, noise, background removal level and bandwidth substantially independently from the other channels. The specific configuration of each channel may be set, changed and updated by the underlying electronics of chip 100.

According to some embodiments of the present invention, the signal received at a certain receiver cell 24, for example via photodetector 143, may be compared to the main transmission signal received at another channel, for example at photodetector 141, in order to identify the signal as a back-up signal of the main signal. Based on the comparison, when the signal received via photodetector 143 is identified as a secondary path signal of the main signal, photodetector 143 may be identified as a back-up channel for the main channel at photodetector 141. There may be other methods for identifying a back-up channel according to embodiments of the present invention.

Chip 100 may be configured so that, for example, if the main channel fails to receive the signal, for example because it is obscured for some reason, chip 100 may continue or switch to receive the communication signal from the pre-identified back-up channel substantially without interruption to the continuousness of the communication. In case there are several back-up channels for the same main channel, chip 100 may continue or switch to receive the communication signal from the currently best pre-identified back-up channel in case of failure of the main channel, where "best" may be selected, for example, as the channel having highest SNR figure.

The communication channels may be used simultaneously in any combination of communication channels, searching channels and or back up channels.

Figure 4A:
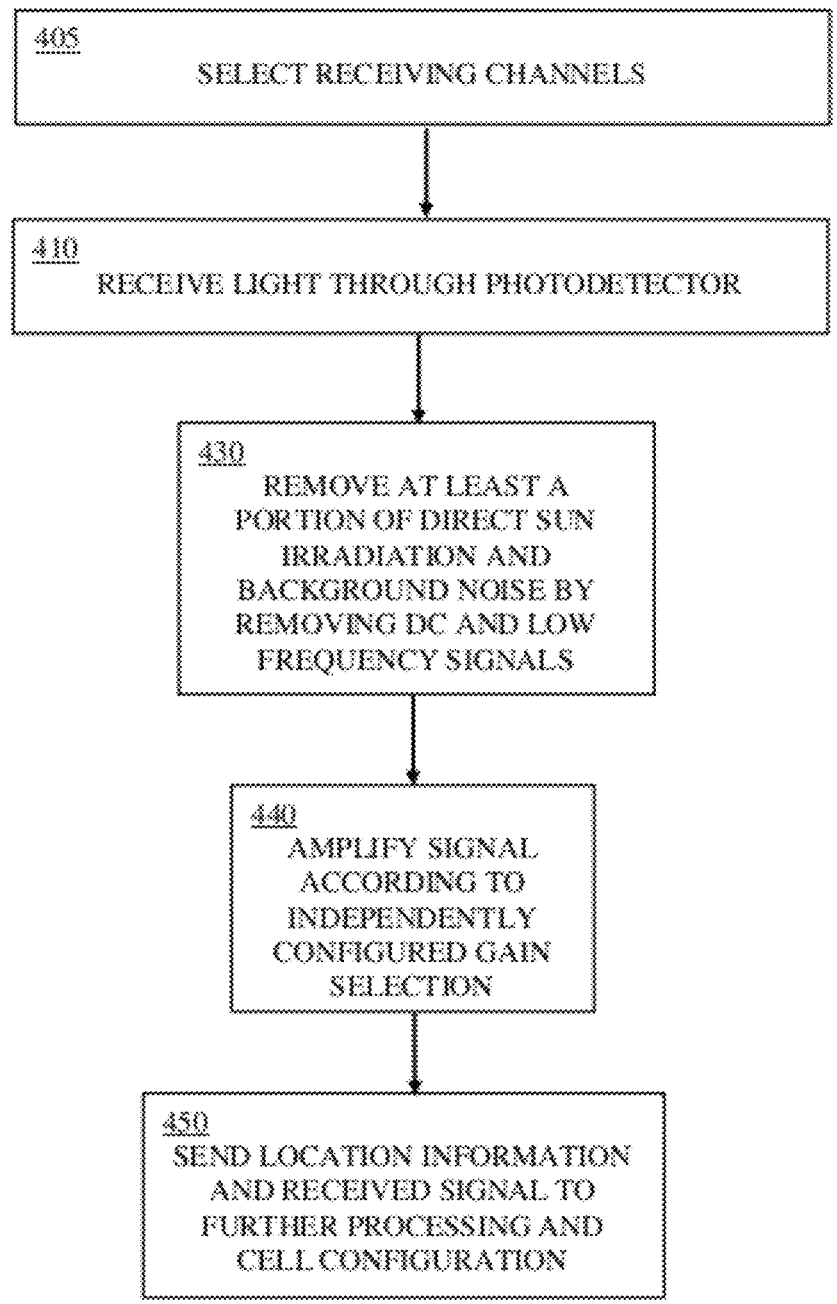
FIGS. 4A and 4B are flowcharts illustrating methods for logical implementation of a receiver cell according to embodiments of the present invention.

Reference is now made to FIG. 4A, which is a flowchart illustrating a method for logical implementation of a receiver cell 24, which may be executed, for example, by processor 32 and/or logical layer 40, according to embodiments of the present invention. As indicated in block 405, the method may include selecting one, some or all of the communicating channels, to be activated at specific cells at known locations on the receiver array 200. As indicated in block 410, the method may include receiving light through photodetector 14 or cluster of photodetectors 14 in each selected channel. As discussed in detail above, the spatial location of the transmitter conveying the transmission may be determined based on the receiver cell location in array 200.

Embodiments of the present invention include processing of the received light signal according to independent configurations of the selected cell, as described herein. As indicated in block 430, the method may include removing from the received light at least a portion of direct sun irradiation (or artificial illumination for the indoors case) and background noise, for example by removing DC and low frequency signals. This may be performed for each communicating channel independently from the other channels, for example according to configuration of each cell activated as communicating channel. In some exemplary embodiments of the present invention, removal of low frequency signals can be performed by a band pass filter, which may be implemented in a voltage amplifier. In some exemplary embodiments of the present invention, removal of low frequency signals can be performed by directly sinking these currents from the photodetector, optionally in combination with a band pass filter. Additionally, in some embodiments, the background noise removal mechanism may be designed to substantially eliminate the amount of light compatible with maximum sky radiance or maximum artificial illumination. Regarding the removal of direct sun irradiation, since the removal of all the direct sun irradiation may cause a significant amount of noise and added physical size to the electrical circuit, at each cell only a portion of the direct sun irradiation may be removed, while the combination of this mechanism over adjacent cells will facilitate fast recovery from direct sun irradiation.

As indicated in block 440, the method may include, after the background noise removal, amplifying the resulted signal according to independently configured gain selection for the specific cell. For example, if the cell is utilized as a back-up channel as discussed above, it may be configured to provide larger gain to the received signal. In some embodiments of the present invention, for example, each channel may be independently configured to one of the following gain combinations: 25 K, 100 K, 250 K, 500 K, 1 M or 2 M. However, the invention is not limited in this sense.

As indicated in block 450, the method may include sending cell location information and/or the received signal resulting from the processing described herein for further processing. For example, the transmission may be sent to a processor or to a user.

Figure 4B:
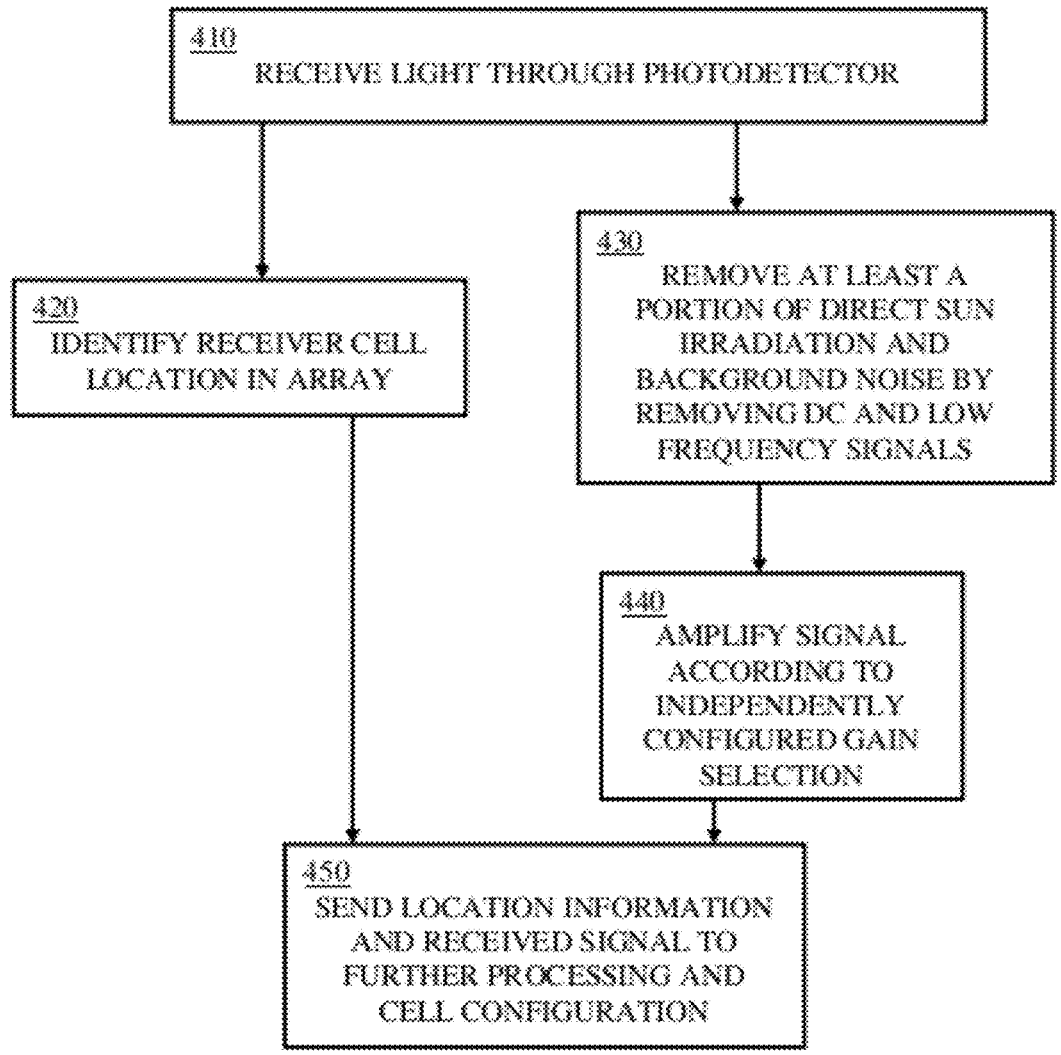

Reference is now made to FIG. 4B, which is a flowchart illustrating another method for logical implementation of a receiver cell 24, which may be executed, for example, by processor 32 and/or logical layer 40, according to embodiments of the present invention. This method may be implemented for each cell 24 independently. As indicated in block 410, the method may include receiving light through photodetector 14 or cluster of photodetectors 14. As indicated in block 420, for each cell receiving the light, the method may include identifying the receiver cell location in array 200. As discussed in detail above, the spatial location of the transmitter conveying the transmission may be determined based on the receiver cell location in array 200.

Embodiments of the present invention include processing of the received light signal according to independent configurations of the selected cell, as described herein. As indicated in block 430 and as discussed in detail with reference to FIG. 4A, the method may include removing from the received light at least a portion of direct sun irradiation (or artificial illumination) and background noise, for example by removing DC and low frequency signals.

As indicated in block 440 and as discussed in detail with reference to FIG. 4A, the method may include, after the background noise removal, amplifying the resulted signal according to independently configured gain selection for the specific cell.

As indicated in block 450 and as discussed in detail with reference to FIG. 4A, the method may include sending cell location information and the resulted received signal to further processing.

Figure 5:
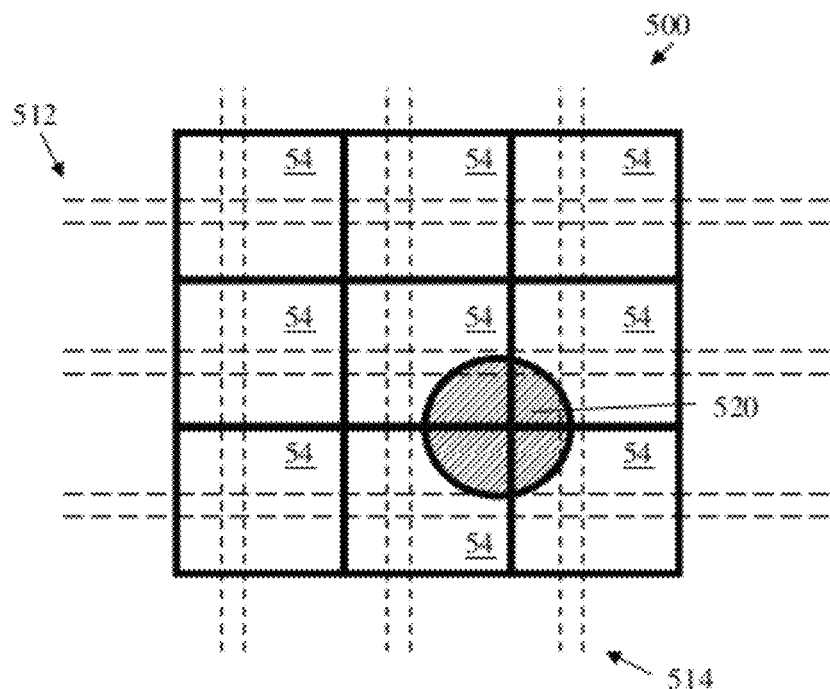
FIG. 5 is a schematic illustration of an optical receiver array according to embodiments of the present invention.

Reference is now made to FIG. 5, which is a schematic illustration of an optical receiver array 500 according to embodiments of the present invention, which may be, for example, similar to array 200 described above and may be included in receiver chip 100 or in similar chip. Receiver array 500 may include square cells 54 which may function similarly to cells 24 described above. Usage of square cells may simplify the design of array 500 and/or receiver chip 100.

The location identification of each cell 54 may be performed by construction of row lines 512 and column lines 514, by which the location and/or size of each cell 54 may be identified, selected and/or configured with the relevant parameters.

A received light transmission signal 520, for example in a shape of a light spot, may fall at any location on array 500, and therefore may spread over more than one cell 54. As shown in FIG. 5, when using square cells, the transmission 520 may spread over four cells at most, when the size of the light spot is substantially the size of cell 54. This may cause loss of signal energy, for example, when only some or only one of the cells on which the signal falls is a communicating channel. Alternatively, in order to avoid loss of signal energy, utilization of several adjacent cells as communicating channels for receiving the same signal may be required. The usage of four adjacent cells in order to collect the energy for the same communication channel is supported, however the resulting collected background noise will be larger, since the field of view angle detected by the four cells together is much larger than the angle coverage of the incoming light signal.

Figure 6:
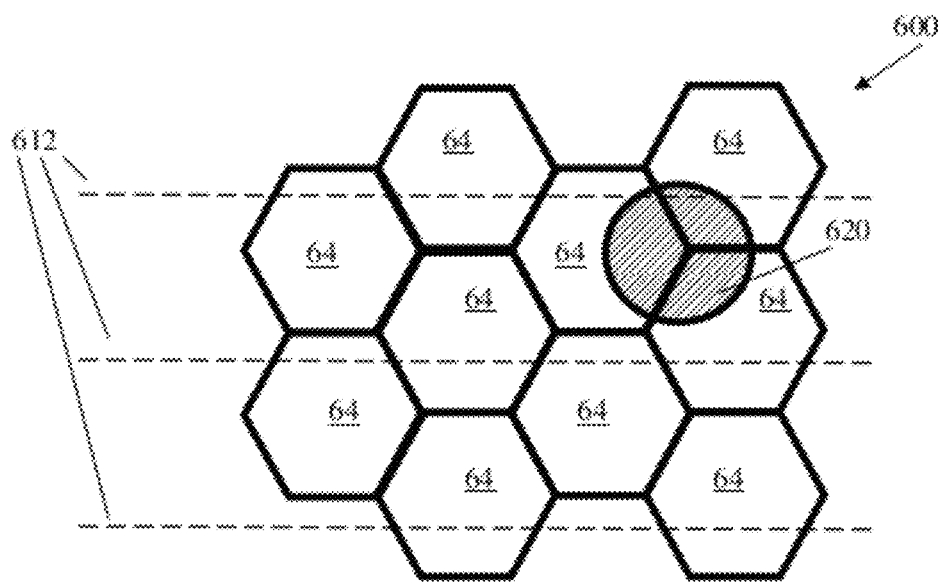
FIG. 6 is a schematic illustration of an optical receiver array according to embodiments of the present invention.

Reference is now made to FIG. 6, which is a schematic illustration of an optical receiver array 600 according to embodiments of the present invention, which may be included in receiver chip 100 or in similar chip. Receiver array 600 may include hexagonal cells 64, i.e. which have hexagonal cross-sections, which may function similarly to cells 24 described above.

The location identification of each cell 64 may be performed by construction of row lines 612 and column lines (not shown), by which the location and/or size of each cell 64 may be identified, selected and/or configured.

In some cases hexagonal cells may be preferable over square cells. For example, as shown in FIG. 6, when using hexagonal cells, the light spot energy of transmission 620 may spread over three cells at most compared to four cells when using square cells. Therefore, for example, less signal energy may be lost when the transmission falls between cells. Alternatively, fewer adjacent cells may have to be configured as receiving channels and therefore less background noise will be added.

Figure 7:
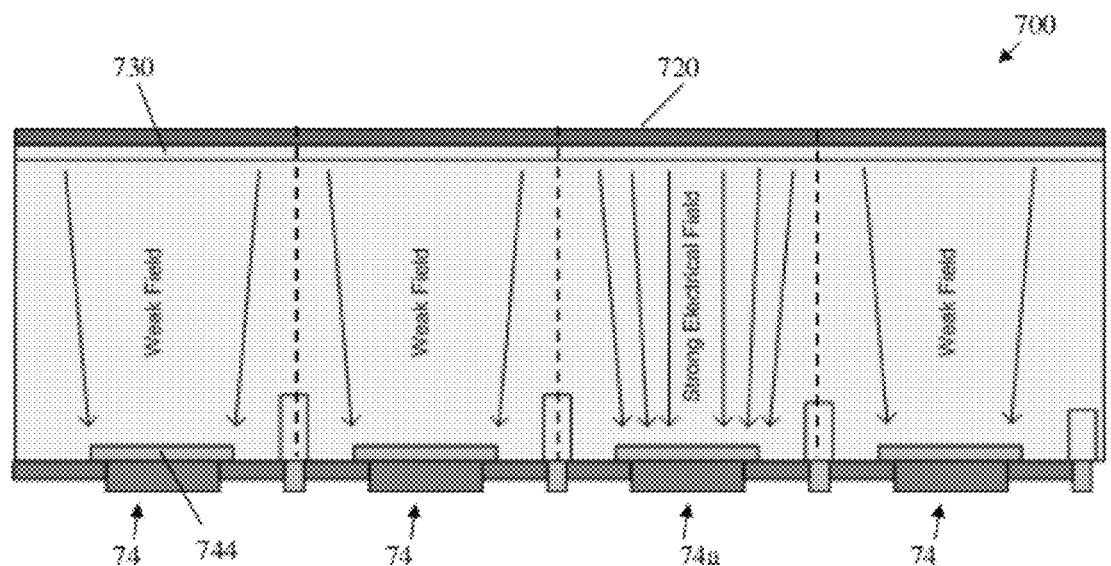
FIG. 7 is a schematic cross-sectional illustration of a receiver chip according to embodiments of the present invention.

Reference is now made to FIG. 7, which is a schematic cross-sectional illustration of a photodetectors array 700 which may be included in a receiver chip 100 or a similar chip according to embodiments of the present invention. The cross-section plane is perpendicular to the light-sensitive face of chip 100. Array 700 may include an optical window, lens, lenses or micro-lenses 720 over an array of photodetectors 74, which may be similar and/or function similarly to photodetectors 14 described in detail above. Each photodetector 74 may be included in a receiver cell similar, for example, to cell 24 in array 200, as described in detail above. Each photodetector 74 may include photodiode(s) or a similar element, such that a certain amount of light hitting the photodiode electrode plate causes charges to move towards an anode electrode plate of said photodiode. Each photodetector 74 may include an independent electrode plate 744 as well as a second common electrode plate 730, which may be common to all photodetectors 74. The electric charge on independent electrode plate 744 may be independently configurable so that, for example, the electric field in each photodetector 74 may be independently configurable. These common and independent plates may constitute electrodes such as an anode and cathode (or vice versa) of photodetector 74. Additionally, the common contact plate 730 can be implemented as an independent contact as well, similar to plate 744. Some of photodetectors 74, such as, for example, photodetector 74a, may be included in a cell 24 activated as a channel for receiving light signals. The adjacent cells to each channel may usually be non-activated cells. However, the channels may be sufficiently close so that charges may occasionally be swept towards an anode of the wrong channel, and thus signal energy may leak from one channel to another and cause distortions in the signals received by the channels, this phenomenon is known also as cross-talk. In order to reduce leakage of signals from one channel to another, the electric field in each cell may be controlled to guide the signal in a correct path, e.g. towards the right anode (or cathode). For example, the electric field inside activated channel cells may be sufficiently higher than the electric field inside non-activated cells, so that the charges in one channel will not be swept towards anodes of other channels. This electric field may also be independently configurable per photodetector/cell, in a similar way like the gain, noise, background removal level and bandwidth.

The photodiode plates may cause undesired capacitance in the cells, which may slow down the data rate.

Figure 8:
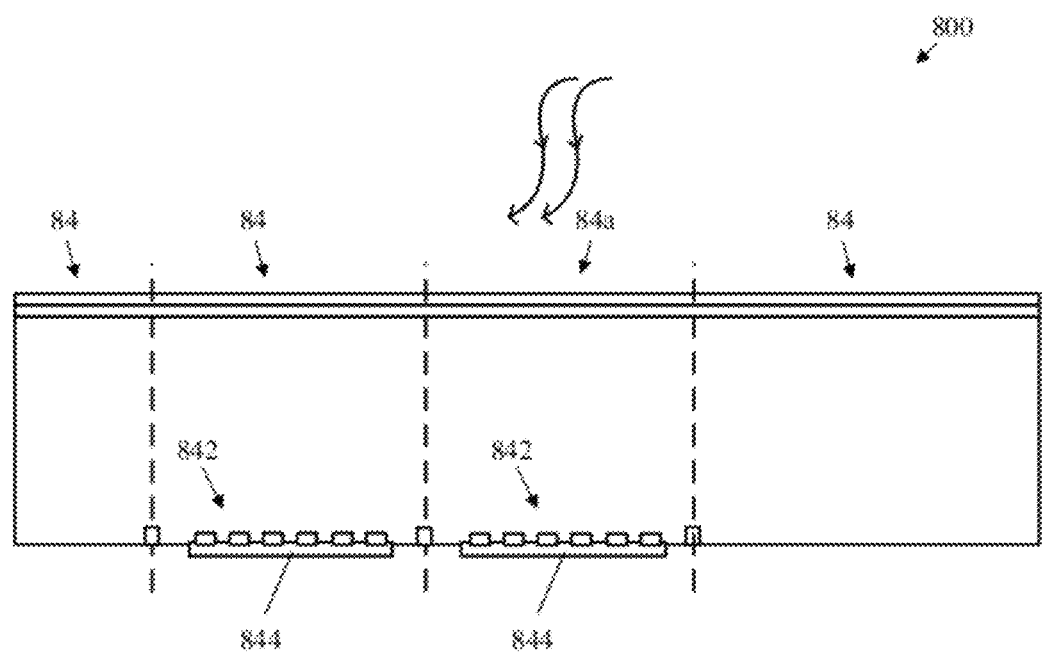
FIG. 8 is a schematic cross-sectional illustration of a receiver chip according to embodiments of the present invention.

Reference is now made to FIG. 8, which is a schematic cross-sectional illustration of a photodetectors array 800 which may be included in a receiver chip 100 or a similar chip according to embodiments of the present invention. The cross-section plane is perpendicular to the light-sensitive face of chip 100. Array 800 may include an optical window, lens, lenses or micro-lenses 820 over an array of photodetectors 84, which may be similar and/or function similarly to photodetectors 14 described in detail above. Each photodetector 84 may include photodiode(s) or a similar element, such that a certain amount of light hitting the photodiode plate causes charges to move towards an anode plate of said photodiode. Each photodetector 84 may include several distributed contact plates 842 connected in parallel to an independent connector plate 844, which may be independently configurable similarly to plate 744 described above. Each distributed contact plates 842 may function as the photodetector electrode (anode or cathode) of a photodetector 84 and can be arranged as a grid or as any other geometrical arrangement. This may reduce the overall plate area of photodetector 84 relative to a plate area of a single large photodiode, and thus, for example, reduce the undesired capacitance. Additionally, this construction may improve reliability and yield of the channels, since failure in one (or more) of the independent elements may not cause a channel failure, since the other photodiodes may function as backup elements.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for on-chip multi-node visible light communication, the system comprising:
    an array of receiver cells comprising an array of photodetectors, each receiver cell includes at least one photodetector and is to receive light through said at least one photodetector;
    a logical layer to independently configure at least one selected receiver cell as a communication receiving channel; and
    a processor to receive data from said logical layer and control said logical layer for configuration of said receiver cells
    wherein the processor is to process light carrying a communication signal received through said at least one photodetector of a specific receiver cell according to independent configurations of the specific receiver cell, and
    wherein the processor is to identify as a back-up channel a receiver cell that receives light carrying said communication signal in a secondary path and switch to receive the communication signal from back-up channel if said specific receiver cell fails to receive the signal.

2. The system of claim 1, wherein the processor is to select a specific receiver cell of said array of receiver cells to be activated as a communication channel.

3. The system of claim 1, wherein the processor is to identify location in said array of receiver cells of a receiver cell through which light is received.

4. The system of claim 2, wherein the processor is to dedicate a searching channel adjacent to said receiver cell activated as a communication channel and to detect spatial shift of incident light carrying the communication.

5. The system of claim 4, wherein the processor is to constantly change the location of said dedicated searching channel.

6. The system of claim 1, comprising an optical element to concentrate light onto said array of receiver cells.

7. The system of claim 1, wherein each of said photodetectors includes first and second electrode plates, wherein at least the first electrode plate is an independent plate so that the electric field in each photodetector is independently configurable.

8. The system of claim 7, wherein said independent plates includes several distributed contact plates connected in parallel to a connector plate.

9. The system of claim 1, wherein the receiver cells have hexagonal cross-sections.

* * * * *